United States Patent [19]
Leininger

[11] Patent Number: 6,053,632
[45] Date of Patent: Apr. 25, 2000

[54] APPARATUS FOR MEASURING TEMPERATURE INSIDE REACTORS

[75] Inventor: Thomas F. Leininger, Chino Hills, Calif.

[73] Assignee: Texaco Inc., White Plains, N.Y.

[21] Appl. No.: 09/175,809

[22] Filed: Oct. 20, 1998

Related U.S. Application Data

[60] Provisional application No. 60/062,605, Oct. 20, 1997.

[51] Int. Cl.[7] .................................. G01J 5/08; G01J 5/54
[52] U.S. Cl. ............................................. 374/130
[58] Field of Search ........................... 374/208, 130, 374/141

[56] References Cited

U.S. PATENT DOCUMENTS

| | | | |
|---|---|---|---|
| 3,845,661 | 11/1974 | Hollweck et al. | 374/208 |
| 4,396,401 | 8/1983 | Davis | 48/85.2 |
| 5,000,580 | 3/1991 | Leininger et al. | 374/130 |
| 5,281,243 | 1/1994 | Leininger | 44/629 |
| 5,338,489 | 8/1994 | Jung et al. | 252/373 |
| 5,372,618 | 12/1994 | Andrus, Jr. | 374/141 |
| 5,775,807 | 7/1998 | Dutcher | 374/208 |
| 5,821,861 | 10/1998 | Hartog et al. | 374/130 |

FOREIGN PATENT DOCUMENTS

| | | |
|---|---|---|
| 2666892 | 3/1992 | France . |
| 4025909 | 7/1991 | Germany . |
| 2093588 | 9/1982 | United Kingdom . |

*Primary Examiner*—G. Bradley Bennett
*Assistant Examiner*—Gail Verbitsky
*Attorney, Agent, or Firm*—Harold J. Delhommer; Arnold, White & Durkee

[57] ABSTRACT

An apparatus for measuring the temperature of a gasification reactor using an optical pyrometer is disclosed. In one embodiment the apparatus may include a feed injector adapted to receive light conduits. The feed injector (2) includes a feed injector tip (6) having an opening, the feed injector tip being in fluid communication with a feed inlet (8) and a flange connector (4), the flange connector being in optical alignment with the opening of the feed injector tip. A blind flange (10) should be sized to fit on the flange connector of the feed injector and thereby form a gas pressure resistant seal. A pressure sealing gland (12) is fitted in the blind flange such that a light conduit (22a or 22b) can pass through the blind flange and that the receiving end of the light conduit extends into the feed injector such that the light receiving end of the light conduit is in optical alignment with the opening of the feed injector tip. An optical coupler (26a or 26b) functions as an optical connection between the light transmitting end of the light conduit to an fiber optic cable (28a or 28b) and thus to an optical pyrometer.

15 Claims, 7 Drawing Sheets

APPARATUS FOR MEASURING TEMPERATURE INSIDE REACTORS

This application claims the benefit of U.S. Provisional Ser. No. 60/062,605 filed Oct. 20, 1997.

FIELD OF THE INVENTION

The present invention is generally directed to an apparatus that is useful in determining the temperature of a reactor under elevated pressure and temperature conditions. In particular, the present invention allows the use of an optical pyrometer to measure the temperature of a gasification unit while locating the optical pyrometer in a local ion remote from the reactor.

BACKGROUND

In the gasification of a hydrocarbon fuel such as coal or coke, for example, the fuel, in particulate form, is fed into the gasifier reaction chamber together with an oxidizing gas. Reaction of the particulate fuel with the oxidizing gas results in the production of a raw synthesis gas which is carried from the gasifier for further treatment. The events within the reaction chamber produce not only a usable gas, but also a slag having a constituency which depends to a large degree on the fuel being burned. Since the gasifier for this purpose must be operated at a relatively high temperature and pressure which is well known in the industry, conditions within the combustion chamber must be monitored at all times.

Normally, gasifiers are equipped with one or more temperature monitoring devices. One such device is the thermocouple, a plurality of which may be disposed throughout the refractory lined walls of the gasifier reaction chamber. The thermocouples are placed in the gasifier in such a way that they are separated by a thin layer of refractory from the flames in the reaction chamber. This is done to protect the relatively fragile thermocouple junctions from the environment inside the reaction chamber. Consequently, the thermocouples do not sense the reaction temperature directly, but instead respond to the heat transmitted through the refractory layer of the reaction chamber. It should be appreciated that, as a result of the lagtime inherent in conductive heat transfer, there may be a substantial delay in thermocouple response to changes in temperature within the reactor. This is especially true during gasifier startup when reaction initiation results in a rapid temperature rise which must be detected in order to confirm that the reactions have initiated. In addition, heat transfer lagtimes effect thermocouple response to operating condition changes during normal gasifier operation.

As an alternative to thermocouples, pyrometers are sometimes used to measure reaction temperature. Physically, the pyrometer is mounted external to the reactor and views the reaction chamber through a gas purged sight tube which normally extends from the pyrometer into the reaction chamber.

A major weakness of the pyrometer temperature monitor arises from the difficulty encountered in keeping the sight tube free of obstructions. The potential for obstruction is great, resulting from the atmosphere within the reaction chamber which is characterized by rapid swirling of particulate carrying gas. Further, a slag which results from ungasifiable material within the fuel, will likewise swirl around the reaction chamber, contacting the walls of the latter. In the course of gravitating towards the lower end of the gasifier, slag normally displays a tendency to cling to the reaction chamber walls. The clinging slag and the swirling particles interfere with the operation of the pyrometer sight tubes which are positioned in the reaction chamber walls. In addition, during the gasifier startup sequence, fuel is introduced into the reactor before oxidant. Depending upon the circumstances and upon the fuel, coal-water slurry for example, there exists an increased tendency for obstruction of the pyrometer sight tubes with unreacted fuel.

Alternately, if a nonprocess gas (e.g. an inert gas such as nitrogen) is used as the purge gas, the product from the reaction chamber will be slightly diluted by the pyrometer purge gas. If the gasifier is producing a synthesis gas for a chemical process, the presence of a diluent gas may not be acceptable.

In order to maintain a clear line of sight into a high pressure reactor as well as the pressure integrity of the reactor vessel, optical access ports involving elaborate high pressure sight glasses are required. For example, in the case of coal gasification, a gas purged sight glass arrangement (for example, see U.S. Pat. No. 5,000,580) is used to keep the sight glass clear of the molten slag and solid particles which swirl around the inside of the gasifier. For safety reasons, a shutoff valve connected to an emergency shutdown system is also used to prevent the gasifier from depressuring through the optical access port in the event that a sight glass breaks.

Current optical access ports are effective and reliable. However, they are expensive, they introduce an added safety concern into the process (because of the slight potential for sight glass breakage) and the required purge gas is sometimes an unwanted diluent in the reactor product. Also, because of their size, they make it difficult to obtain more than one process measurement through a single optical access. Modern process safety systems, however, often require triply redundant measurements.

Under certain circumstances, it is possible to eliminate the complicated high pressure sight glass and optical pathway purge system by using elements of the gasification process itself For example, in natural gas gasification, where a two-stream process injector is used, the oxygen lance feed tube provides a completely unobstructed sight path of circular cross-section into the reaction chamber. The flowing oxygen itself serves as the purge gas. And, because the reaction zone at the exit of the process injector is entirely gaseous, there is nothing (no solid or liquid particles) to obstruct the optical pathway into the interior of the reaction chamber. U.S. Pat. No. 5,281,243 shows one such scheme for measuring gasifier temperature through the process feed injector oxygen lance.

Even though the inventions in U.S. Pat. Nos. 5,000,580, and 5,281,243 are successful, the present invention greatly improves the ability to measure gasifier temperature by simplifying the optical access by the elimination for the need of a optical site window. In addition, the present invention makes the measurement system more rugged and durable, given the harsh conditions of the reactor, while also allowing one to obtain triply redundant temperature measurements which previously has not been possible.

SUMMARY OF THE INVENTION

The present invention is generally directed to an apparatus for measuring the temperature of a reactor using an optical pyrometer. An illustrative embodiment of such an apparatus may include: a feed injector, a blind flange, a light conduit, a pressure sealing gland, an optical coupler and a pyrometer. The feed injector includes a feed injector tip having an opening, the feed injector tip being in fluid communication with a feed inlet and a flange connector, the flange connector being in optical alignment with the opening of the feed injector tip. The blind flange should be sized to fit on the flange connector of the feed injector and thereby form a gas pressure resistant seal. The pressure sealing gland is fitted in the blind flange such that the light conduit can pass through the blind flange and that the receiving end of the light conduit extends into the feed injector such that the light receiving end of the light conduit is in optical alignment with the opening of the feed injector tip. The optical coupler functions as an optical connection between the light transmitting end of the light conduit to a optical fiber cable and thus the pyrometer.

In one preferred embodiment, the apparatus further includes: a second light conduit, the second light conduit having a light receiving end and light transmitting end; a second pressure sealing gland fitted in the blind flange such that the second light conduit can pass through the blind flange and that the light transmitting end of the light conduit is in optical alignment with the opening of the feed injector tip; and a second optical coupler, the optical couple connecting the light receiving end of the second light conduit to a second fiber optic cable. A coherent light source in the pyrometer should be optically coupled to the light conduit such that light passes out of the source, through the second fiber optic cable to the light receiving end of the second light conduit, through the second light conduit and out the light transmitting end of the light conduit and out the opening in the injector tip. The receiving end of the first light conduit should be optically aligned to receive the reflections of the coherent light transmitted by the second light conduit out the opening in the injector tip. In one embodiment the light conduit may be a sapphire rod or sapphire optical fiber. Alternatively, the light conduit may be a metal coated silica optical fiber.

These and other features of the present invention are more fully set forth in the following description of illustrative embodiments of the invention.

BRIEF DESCRIPTION OF THE DRAWINGS

The following description is presented with reference to) the accompanying drawings in which.

DISCLOSURE OF THE INVENTION

Figures 1, 2:
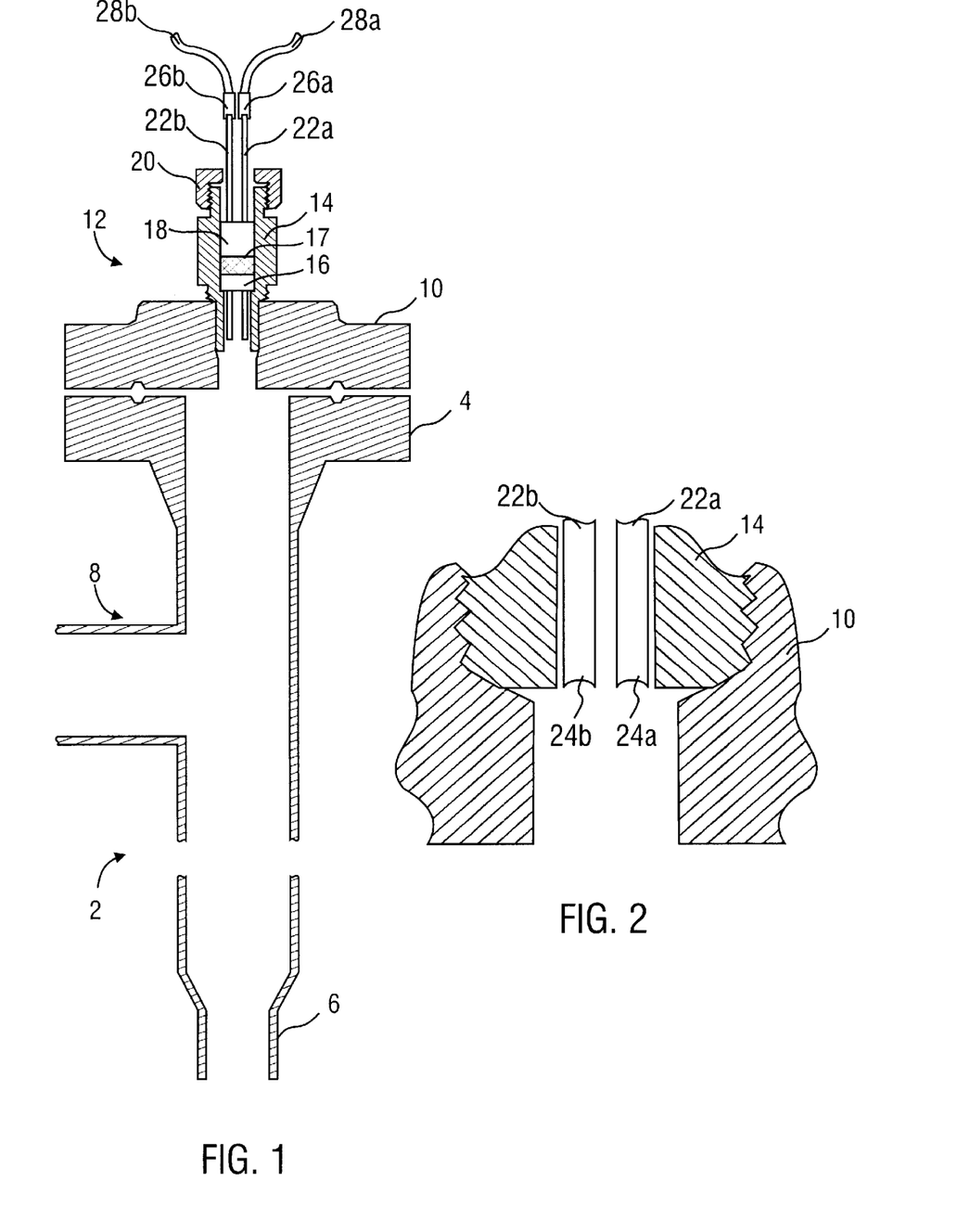
FIG. 1 is a schematic cross section of a feed injectoroxygen lance incorporating an illustrative embodiment of the present invention.
FIG. 2 is a magnified view of the reactor ends of the light conduits utilized in the embodiment shown in FIG. 1.

Turning now to the figures, FIG. 1 illustrates a schematic cross section of a process feed injector oxygen lance 2 incorporating an embodiment of the present invention. The process feed injector is made of an Inconel 600 or other suitable material. A welding neck flange 4 is connected to the top of the lance, and an injector tip 6 is connected to the bottom of the lance. Oxygen or other suitable oxidant is introduced through an oxidant inlet conduit 8 in fluid connection with the injector tip. Although shown as T-joint, other embodiments will be apparent to one of skill in the art. A blind flange 10 is connected to and seals the welding neck in a conventional manner.

The blind flange is coupled to a pressure seal fitting 12 aligned along the central axis of the process feed oxygen injector lance when the blind flange is attached. This connection may be a threaded coupling as shown or other suitable means for coupling the pressure seal fitting to the blind flange so that the coupling is durable, and pressure and temperature resistant. The pressure seal fitting includes a pressure seal body 14, a pressure seal seat 16, a pressure seal sealant 17, a pressure seal follower 18 and a pressure seal cap 20. The pressure seal fitting is adapted so as to create an optical pathway through the insertion of one or more light conduits 22. In the present embodiment, six light conduits, two for each pyrometer, are used to form a pressure barrier between the interior of the feed injector oxygen lance and the area outside the blind flange. Each light conduit should be optically compatible with the pyrometer measuring system, and be able to withstand the environment of the interior of the process injector feed injector oxygen lance. In one embodiment, sapphire rods serve as the light conduits, however, other materials such as metal coated silica optical fibers or other similar such materials may be used as the light conduit depending on the conditions encountered and the wavelength of light used by the pyrometer. The selection of such materials should lie readily apparent to one skilled in the art and can be easily determined by trial and error.

The light conduits of the present embodiment have two ends, a focusing end 24 and an optical fiber coupling end 26. The focusing end of the light conduit (shown in FIG. 2) is the end that is exposed to the interior of the feed injector and serves to focus and gather the light used by the pyrometer to determine the temperature of the reactor. If possible, the focusing end of the light conduit should be modified to change the numerical aperture without using a separate lens, although the use of a separate lens is encompassed by the scope of the present invention. The optical fiber coupling end of the light conduit is adapted so that it can be optically coupled to flexible optical fiber cable 28. The flexible optical fiber cable is in turn optically coupled to a pyrometer (not shown). In the embodiment shown, a laser-based pyrometer is used so that one light conduit, the transmitting light conduit 22a, is optically coupled to the laser source and a second light conduit, the detection light conduit 22b, is optically coupled to the pyrometer detector. In such an embodiment, a pulse of laser light is sent from the laser source in the pyrometer, through the flexible optical fiber cable 28a, through and out the light conduit 22a and into the reactor. The laser light is reflected by the reactor walls and returns to the detection light conduit 22b where it passes through the light conduit and the flexible fiber optic cable 28b to the pyrometer detector. In addition, infrared radiation emitted by the hot reactor wall is also detected by the pyrometer via the detection light conduit 22b and the flexible fiber optic cable 28b. The laser-based pyrometer uses the measurement of the reflected laser pulse to determine the emissivity of the reactor wall. With the emissivity of the reactor wall known, the pyrometer can then calculate the temperature of the reactor from the emissivity and the measurement of the detected infrared radiation emitted by the hot reactor wall.

In the illustrative embodiment shown in FIG. 1 three pairs of light conduits, for a total of six, are used so as to achieve triple redundancy. For clarity purposes, four of the six light conduits are not shown in FIG. 1.

Figures 3, 4:
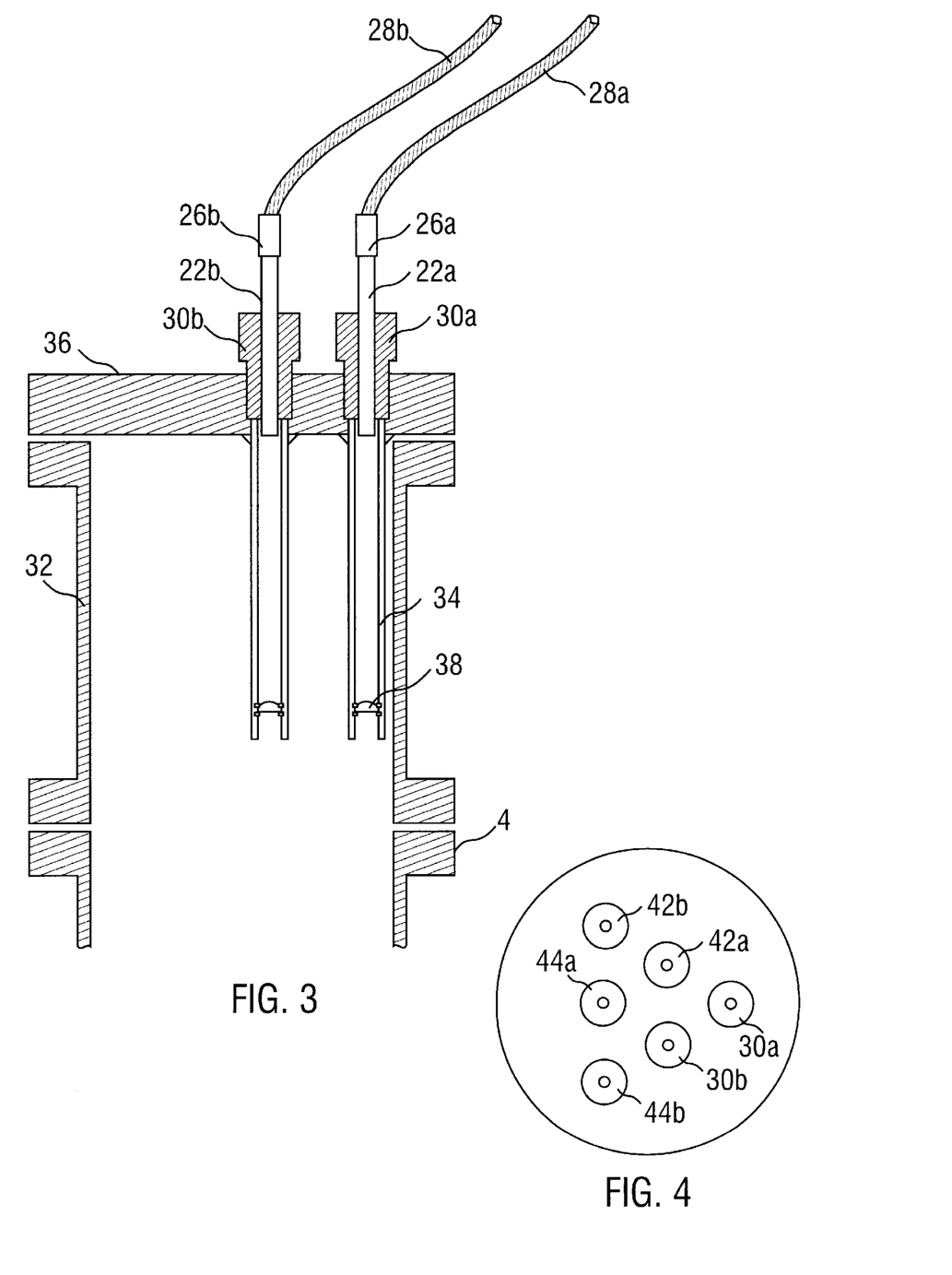
FIG. 3 is a schematic cross section of a second illustrative embodiment of the present invention.
FIG. 4 is a top view of the layout of the positions of the six pressure seal fittings in the blind flange 36 shown in FIG. 3.

An alternative embodiment of the present invention is shown in FIG. 3. In the embodiment shown, each light conduit has its own pressure seal fining 30 as opposed to one pressure seal fitting for multiple light conduits as in the above embodiment. All piping and flange components are conventional and are made of materials compatible with the installation. In addition, a spool piece 32 has been inserted so as to provide additional space in the interior of the feed injector oxygen lance for supplemental optical components. The supplemental optical components include an optical isolation tube 34 which is connected to the bottom of the blind flange 36. The role of the optical isolation tube is to focus the beam of laser light used in the determination of the reactor temperature. As shown, the optical isolation tube is a tube made of oxygen compatible material in which a small imaging lens 38 has been mounted. The role of the imaging lens is to focus the beams of laser light on to the ends of the light conduits. The lens may be made of sapphire or it may be made of other suitable material such as quartz or other high temperature optically clear material. Retaining means, such as retaining rings, retaining sleeves or the like may be used in mounting the lens in or on the end of the optical isolation tube not connected to the blind flange.

FIG. 4 shows a top view of the layout of the positions of the six pressure seal fittings in the blind flange. Pressure seal fittings with the same number are optically coupled to each other and to the same pyrometer. The pressure seal fitting used for he transmitting light conduit has been given the letter "a" after the number while the pressure fitting for the corresponding receiving light conduit is designated by the letter "b". The layout shown is one possible layout scheme, and one skilled in the art could readily make other alternative layouts which are considered to be within the scope of the present invention.

Figure 5:
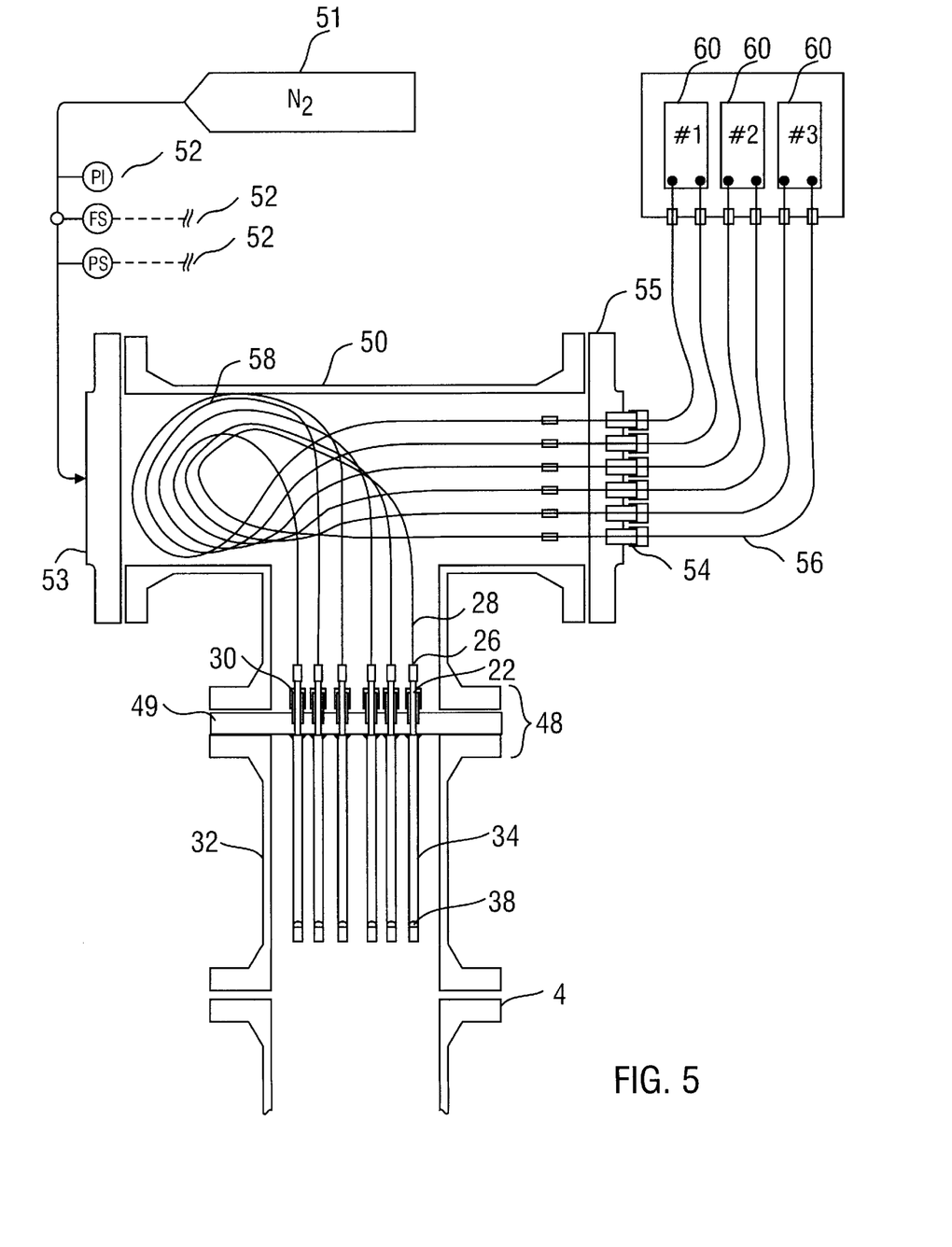
FIG. 5 is a schematic cross section of a third illustrative embodiment of the present invention incorporating a nitrogen buffer chamber.

FIG. 5 illustrates yet another embodiment of the present invention. In addition to the spool piece shown in FIG. 3 a safety buffer chamber 50 has been included. The safety buffer chamber is connected to a source of pressurized nitrogen gas 51 so that in the unlikely event of a leak of the pressure fitting holding the light conduits, no oxygen leaks out. Instead, the pressure of nitrogen in the safety buffer chamber is higher than the pressure of oxygen and any leak will cause a small amount of nitrogen to leak into the reactor. A safety alarm system 52 monitors the pressure in the safety buffer chamber and the zero flow condition in the nitrogen line to the buffer chamber. If the pressure in the chamber drops or a flow of nitrogen is detected, an alarm is triggered to alert the reactor operators. As shown, the safety buffer chamber may be a tee-fitting in which the one branch of the "tee" is connected to a blind flange that in turn is connected to the high pressure nitrogen source and the alarm system which detects leaks as described above. The opposite branch of the "tee" is coupled to a blind flange that is adapted to receive a plurality (six are shown) of high pressure sealing glands 54 each of which allows a flexible fiber optic cable 56 to pass from outside the safety buffer chamber to the inside of the safety buffer chamber. Fiber optic connectors 59 connect the external fiber optic cables 56 to the loops of flexible fiber optic cable 58 on the inside of the safety buffer chamber. These internal loops of flexible fiber optic cable are present to ease in the assembly and disassembly. Also shown in FIG. 4 are the three external pyrometer units 60 which provide the reactor control room with three temperature output values thus making the system triple redundant.

It should be noted at this point that significant elements of the above described embodiments of the present invention are: 1) the use of the process feed injector oxygen lance as a purged sight path into the hot, high pressure, hostile environment of the gasifier, 2) the use of a optical fiber component to provide optical access through a high pressure seal, or series of seals, located on the top flange of a process injector and 3) the recognition that, once inside the feed injector oxygen lance, some final optical element is required to focus the pyrometer optical system through the small opening at the exit of the feed injector oxygen lance. This final optical element could be formed directly on the end of the optical fiber or, alternatively, additional lenses could be mounted inside the process injector. One skilled in the art of optical system design should be able to work out the necessary engineering details to accomplish the desired result, that being a rigid, well supported final optical focusing system. Such a system provides not only a viable purged optical pathway for the pyrometer, but it also provides a highly reliable, pressure seal.

It should be noted that, although the drawing shows a high pressure optical fiber seal with only one optical fiber feed through, it should be clearly understood that the same basic concept can easily be extended to a single pressure selaing gland with multiple feed throughs to accommodate multiple sensors. In fact, commercially available high pressure optical fiber seals have been made with 3, 4 or more pairs of feed throughs. In this way, one can easily accommodate a pyrometer where one optical fiber channel is used to launch a pulsed laser beam into the reactor and a second channel is used to measure the reflected laser pulse and to measure the infrared radiation generated by the hot reactor. Three pairs of optical fiber feed throughs would thus provide access for a triply redundant temperature measurement using laser-based pyrometers aimed through the feed injector oxygen lance of a gasifier process injector.

Figure 6:
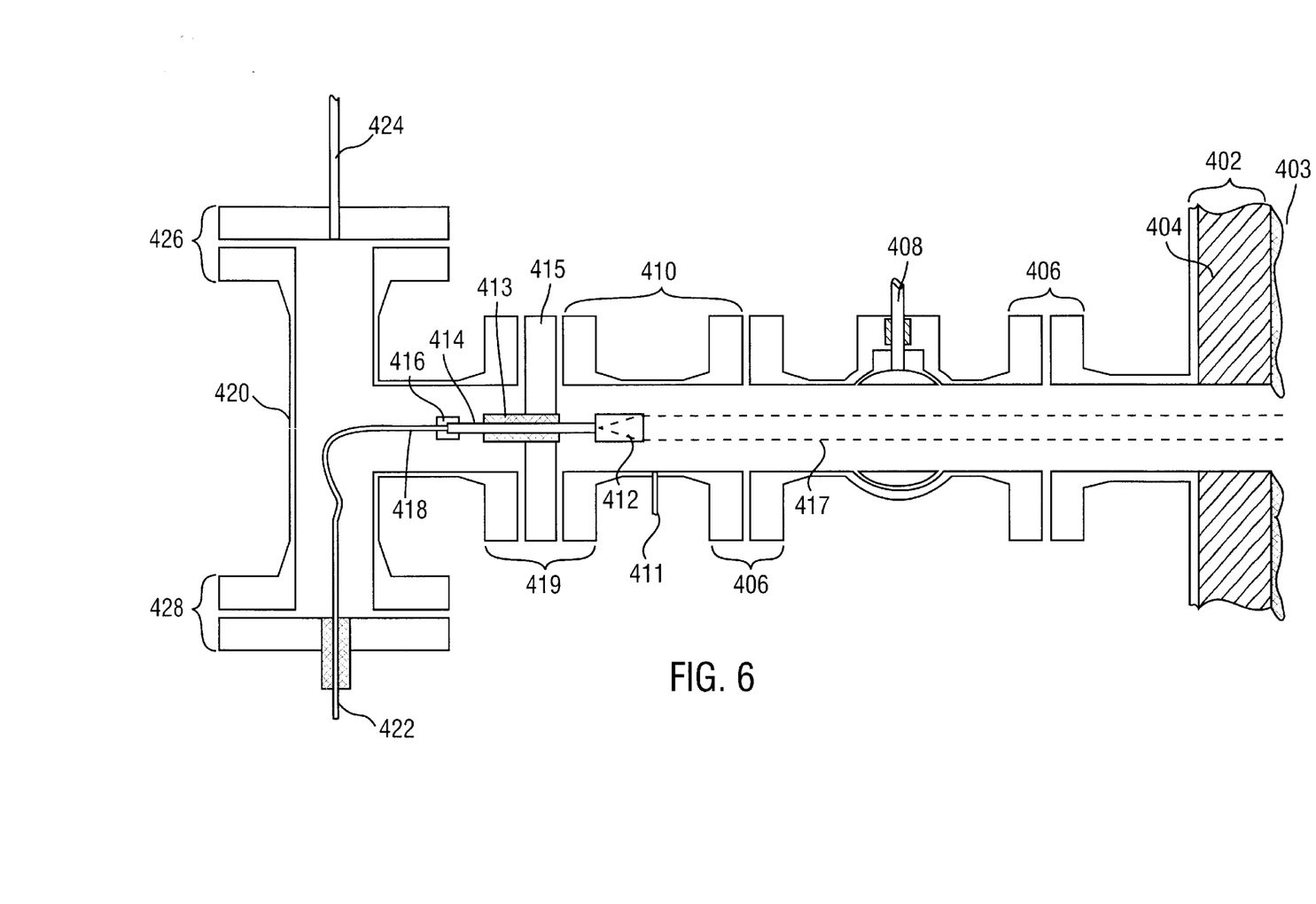
FIG. 6 is a schematic cross section of a fourth illustrative embodiment of the present invention for use through the sidewall of a reactor.

FIG. 6 contains an illustration of how the present invention can be adapted for use on a reactor vessel where there is no gaseous process feed injector containing a gaseuous feed available to purge the sight tube as is the case with the process feed injector oxygen lance of a natural gas gasification unit. As shown in the figure, the wall of a refractory lined high temperature high pressure reactor 402 has a molten slag layer 403 running down reactor wall. Refractory lining 404 helps to retain heat within the reactor and metal wall 405 provides for structural integrity of the reactor. Attached to the metal outer wall 405 of the reactor is a flange connection 406 on to which a safety ball valve 408 is connected. The use and operation of the safety shutoff valve 408 is explained in U.S. Pat. No. 5,000,580 which is hereby incorporated in its entirety herein by reference. This safety ball valve could be considered optional, however, inclusion provides an additional level of safety and allows for the maintenance of the optical pyrometer unit of the present invention without having to shut down the reactor. Spool piece 410 is utilized to provide sufficient room for light conduit 414 and a focusing element 412 on the focusing end of the light conduit. Also connected to the spool piece is a high pressure nitrogen gas inlet 411, which allows optically clean purge gas to enter the optical path 417. The flow of gas serves to keep the optical pathway clear of slag and other materials that may accumulate. The primary pressure sealing gland 413 for light conduit 414 passes through the positioning plate 415 which is part of a flange compression plate fitting connecting the spool piece to the nitrogen buffer chamber 420. High pressure nitrogen is provided to the nitrogen buffer chamber by the high pressure nitrogen line 424 which passes through blind flange 426. By monitoring the pressure and flow of nitrogen into the nitrogen buffer chamber, the presence of a leak may be determined. On the optical fiber coupling end of the light conduit 414, an fiber optic connector 416 connects flexible optic cable 418 to the light conduit. The flexible fiber optic cable passes through the nitrogen buffer chamber and exits via a secondary pressure sealing gland 422 in blind flange 428. The pyrometer unit (not shown) is connected to the fiber optic cable and the temperature of the reactor determined.

In the present embodiment a nitrogen purge is introduced as the purge medium through gas inlet 411, the flow of which keeps the sight path clear. In the case where the pyrometer optical access port would be looking into a gasifier that was running on an ash-containing (slagging) feed such as coal or pet-coke, one could use a ratio (dual wavelength) pyrometer because of their reduced sensitivity to the effects of the gradual occlusion of the sight tube opening caused by accumulating slag. One skilled in the art would note that FIG. 6 goes beyond the basic 3-element concept explained above and shows how one can use some of the ideas to provide optical access even in situations where one cannot, or does not want to, sight down the central passage of a process injector.

Figure 7:
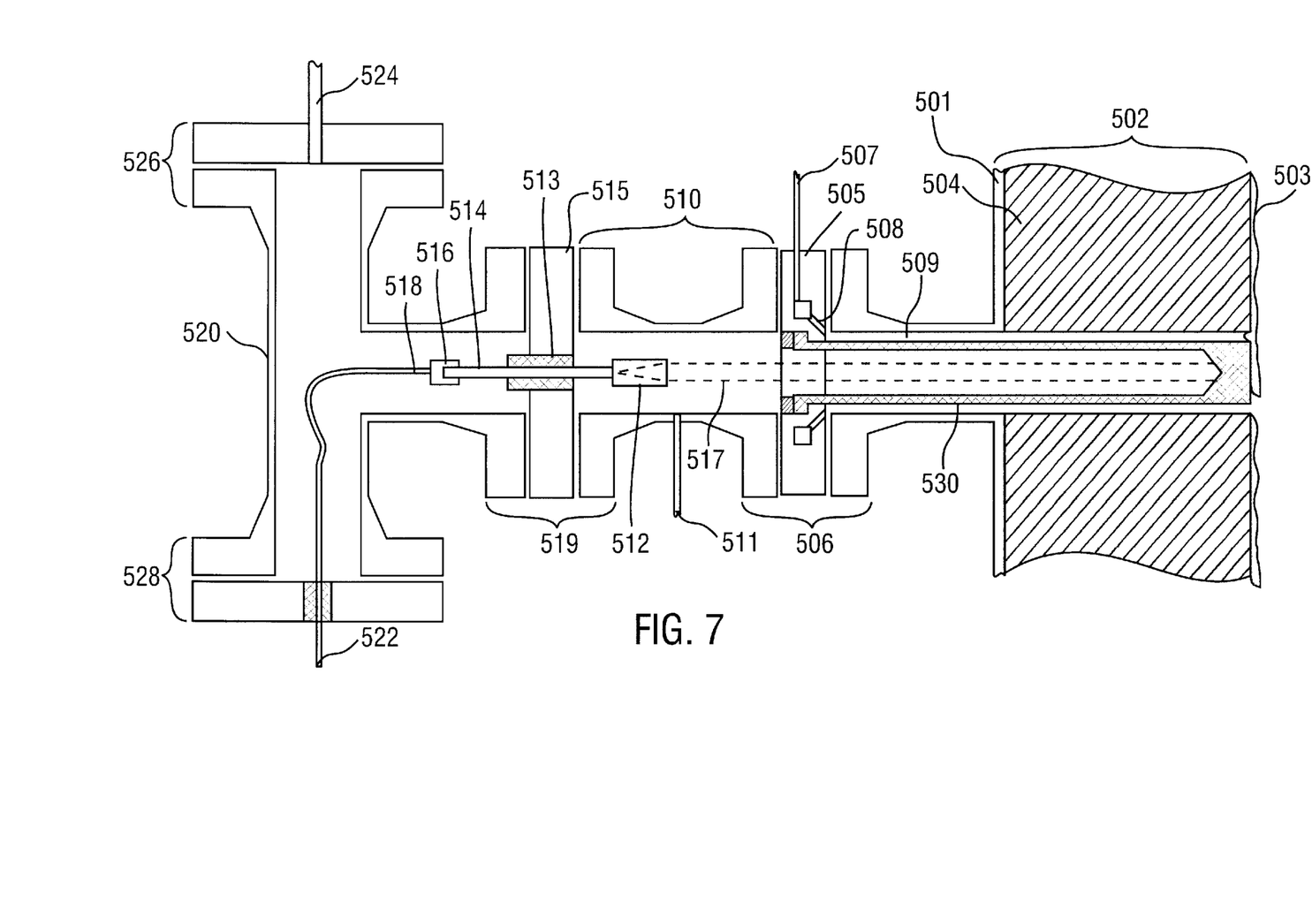
FIG. 7 is a schematic cross section of a fifth illustrative embodiment of the present invention in which a thermowell is in contact with the reactor environment.

FIG. 7 illustrates yet another embodiment of the present invention. As shown in the figure, the wall of a refractory lined high temperature high pressure reactor 502 has a molten slag layer 503 running down reactor wall. Refractory lining 504 helps to retain heat within the reactor and the wall 501 provides the structural integrity of the reactor. Attached to the metal outer wall 501 of the reactor is a flange compression plate fitting 506 which includes a primary purge ring 505. The primary purge ring has connected to it a high pressure nitrogen inlet 507 that in turn passes out the primary purge ring outlet 508 through the primary purge annulus 509 which is formed by the walls of the thermowell 530 and the flange fitting so as to remove any slag that may accumulate on the end of the thermowell. Attached to the flange compression fitting is a spool piece 510 inside of which is the focusing end of the light conduit 514 and the focusing element 512. Also attached to the spool piece is a nitrogen gas line 511 which provides pressurized nitrogen gas thus forming a first nitrogen gas buffer zone. The pressure and flow of the nitrogen gas to this first nitrogen buffer zone can be monitored so that if a leak occurs it can be detected and corrective action can be taken. On the other end of the spool piece from the primary nitrogen purge ring 505 is a second flange compression fitting 519 in which a positioning plate 515 includes a primary pressure sealing gland 513 for the light conduit. Also connected to the second compression flange is a nitrogen buffer chamber 520 similar to that previously described above. Within the nitrogen buffer chamber, the light conduit 514 is optically coupled to a flexible fiber optic cable by way of art fiber optic connector 516. The flexible fiber optic cable 518 is optically connected to a pyrometer (not shown) after passing through a secondary pressure sealing gland 522 for flexible optical fiber cable 518 so that the temperature of the thermowell can be measured. As with the previously described nitrogen buffer chambers, high pressure nitrogen line 524 provides nitrogen and also permits the monitoring for any leaks which may occur.

In the present illustrative embodiment a clear optical sight path into the gasifier interior is not used. Instead, the optical fibers are sighted onto the inside surface of a thermowell 530. A thermowell is a protective sleeve normally used whenever thermocouples are inserted into hostile environments. In this case, a highly conductive and very rugged thermowell material is used, for example TZM alloy Molybdenum, although other suitable materials may also be used Because of the thermowell's high conductivity, the tip will reach a temperature close to the temperature inside the gasifier. With the pyrometer's optical fibers focused onto the inside of the hot tip, which can even be machined into the form of a black body cavity, the pyrometer will sense a temperature very close to that which is in the reactor interior.

Several features of this concept should be explained. Mechanically, the thermowell and the various flanged pieces are assembled in such a way that the entire assembly becomes a small, pressure-tight vessel which can be pressurized to a level greater than that in the gasifier. This is done via nitrogen inlet line 511, and it accomplishes two things. First, it isolates and protects the optics from the dirty environment inside the gasifier. Second, in the event of a leak or a major breach in the thermowell, this "secondary" nitrogen begins flowing into the gasifier rather than hot, dirty syngas flowing out towards the optics. This is good for two reasons. First, the optics should be kept clean. And second, and more importantly, hot gas must be prevented from depressuring through a vessel nozzle, an event which can lead to fire and severe vessel damage. The main reason for the "primary" nitrogen is introduced via line 507 and is to protect the molybdenum thermowell from oxidation during preheat of the gasifier. This stream is turned off just after startup, and turned on again just after shutdown. A low flow rate is used during these periods in order to minimize the cooling effect on the thermowell. The primary nitrogen purge can also be pulsed periodically in order to blow accumulating slag away from the tip of the thermowell, which should make the measurement more responsive. Finally, the "buffer nitrogen" introduced via line 524, which is set at a pressure higher than both the secondary nitrogen and the gasifier, is used as a backup pressure safety feature. In the unlikely event that both the thermowell and the primary pressure feed through on the light conduit leaked, buffer nitrogen would flow into the gasifier, preventing damage to the optics and depressuring of the gasifier through the optical access port.

Although a laser-based pyrometer could be used, the optical access ports shown in FIGS. 6 and 7 may also be used with a dual wavelength pyrometer. The use of a dual wavelength pyrometer is more desirable whenever one wants to measure the temperature of a target which can periodically become partially occluded by intervening material.

Figure 8:
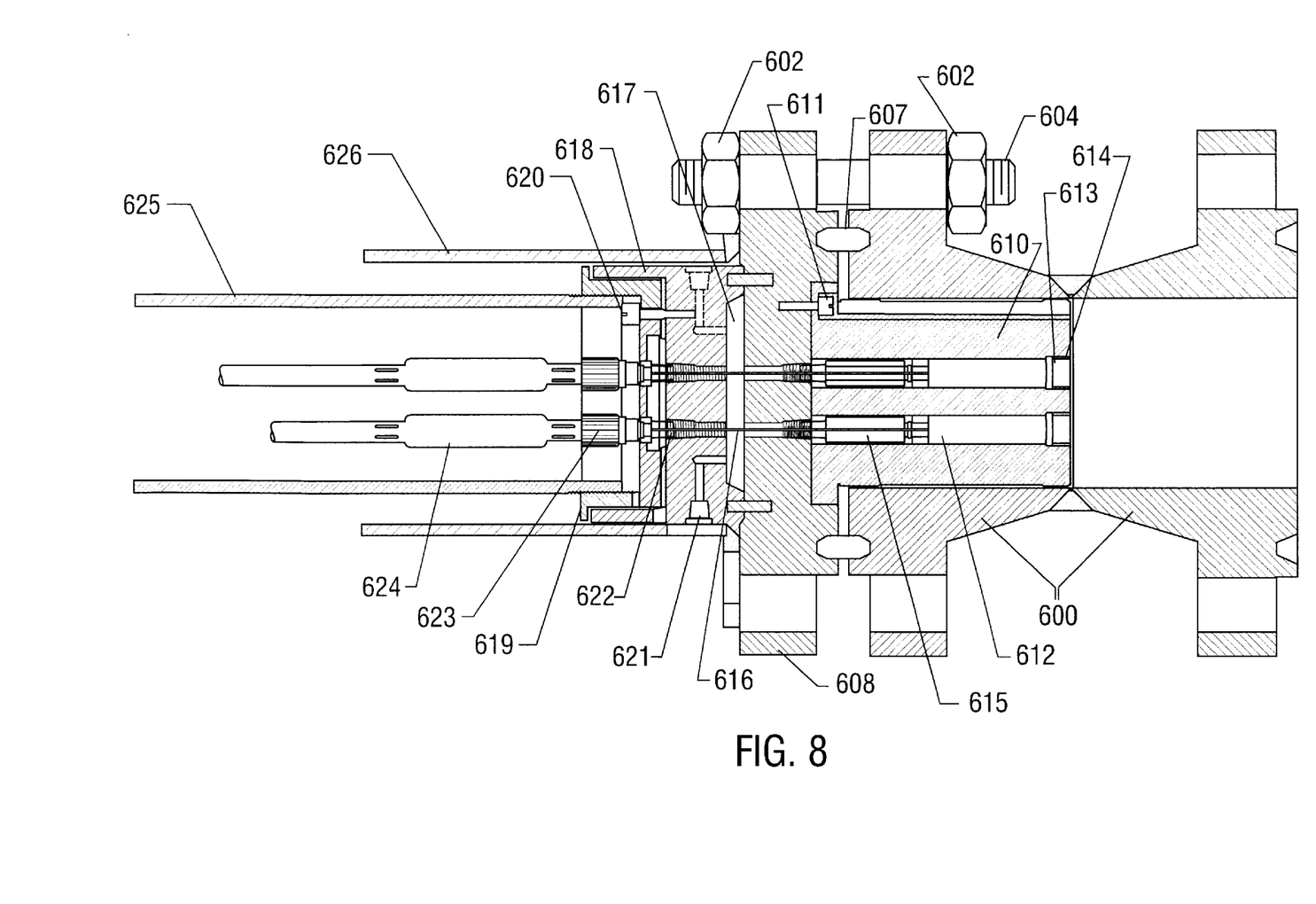
FIG. 8 is a schematic cross section of a sixth illustrative embodiment of the present invention.

FIG. 8 is a cross-sectional drawing of yet another illustrative embodiment of the present invention for attachment to a feed injector oxygen lance currently in use in a gasification unit. As shown a welded connecting spool piece 600 is connected by way of a conventional stud 604, nut 602 and compression ring 607 configuration to a blind flange piece 608 which has been modified in accordance with the present invention. On the face of the blind flange facing towards the welded connecting spool piece, a focusing lens barrel 610 has been affixed by set screws 611. Within the focusing lens barrel is the focusing lens chamber 612 in which focusing lens 613 has been mounted by a lens locking ring 614. The focusing lens may be made of any suitable optically clear material including sapphire, quartz, and other high pressure resistant materials. The focusing lens chamber is of a size such that the other end of the chamber can accommodate the primary pressure sealing gland 615 through which the light conduit 616 passes. The primary pressure sealing gland itself is affixed to the blind flange plate and is shown in greater detail in FIG. 9 The light conduit passes though a pressurized nitrogen buffer chamber 617 which is formed by the blind flange and a nitrogen pressure cap 618. The nitrogen pressure cap is welded to the blind flange plate 608. It is also connected to a seal flange 619 by seal flange set screws 620. Nitrogen is supplied to the nitrogen buffer chamber via nitrogen inlet 621. The pressure and flow of nitrogen into or out of the nitrogen buffer chamber can be monitored to determine the presence of leaks. Passing through the nitrogen pressure cap is the secondary pressure sealing gland 622 which permits the light conduit itself to pass through the nitrogen pressure cap without adversely affecting the pressure integrity of the system. After passing through the secondary pressure sealing gland, the light conduit is optically connected by way of an fiber optic connector 623 to a flexible optical fiber cable 624. The optical fiber cable itself is optically connected to an optical pyrometer (not shown) which may be remotely mounted. This optical connection is protected from inadvertent injury or breakage by an inner protective sleeve 625 which is removably coupled to the seal flange of the nitrogen pressure cap. An additional level of safety against inadvertent breakage of the nitrogen pressure cap is provided by an outer protective sleeve 626 which is removably connected to the face of the blind flange piece.

Figure 9:
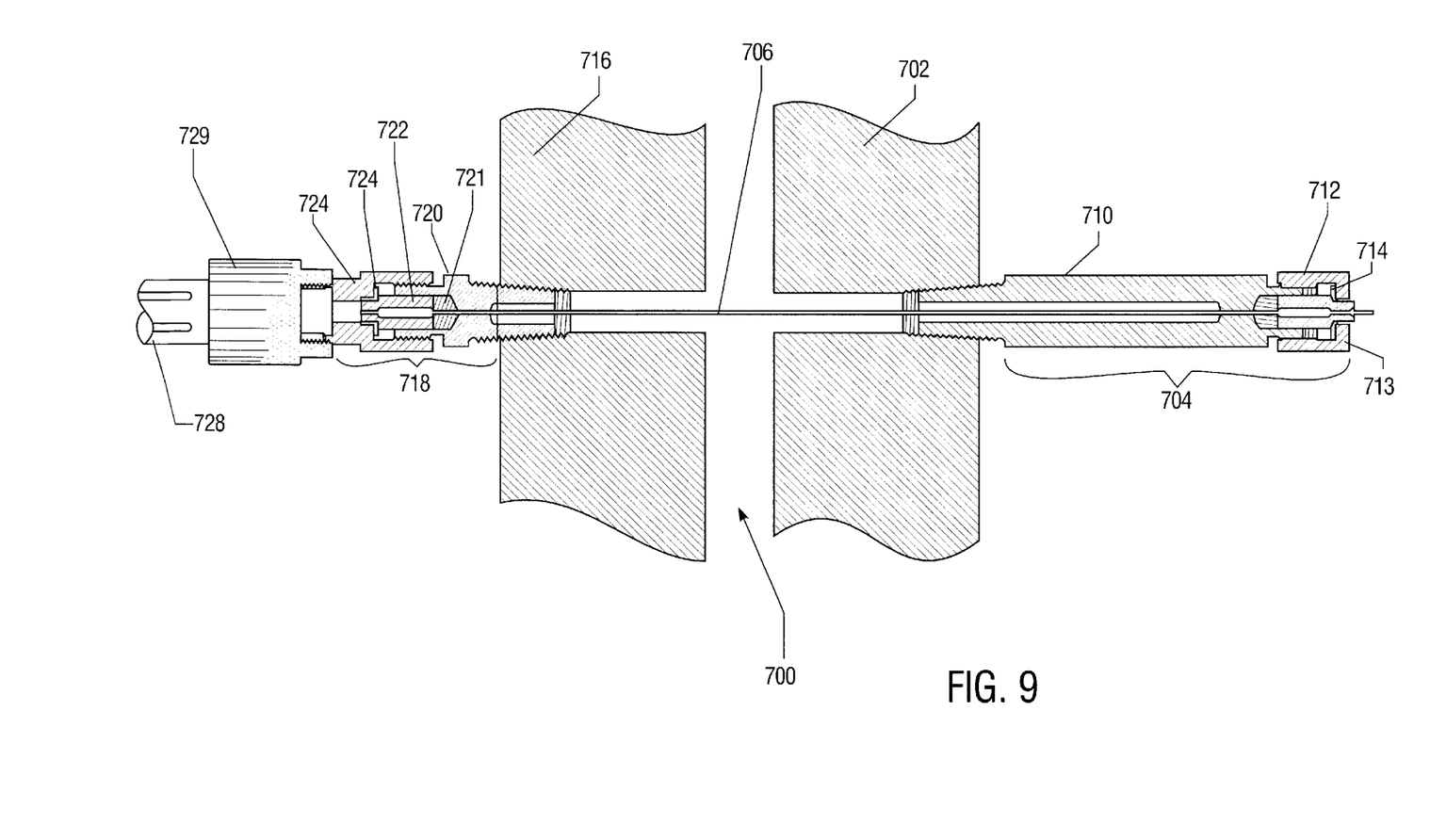
FIG. 9 is a magnified view of an optical fiber as it pisses through the nitrogen purge chamber of the illustrative embodiment shown in FIG. 9.

A detailed view of a portion of the pressurized nitrogen chamber 700 through which a light conduit passes is shown in FIG. 9. As shown the blind flange 702 is fitted with a primary pressure sealing gland 704 so that a light conduit 706 (in this case an optical fiber) can pass through the blind flange. The primary pressure sealing gland includes a gland body 710, a optical fiber T-ferrule 712, T-ferrule washer 714 and a compression nut 713. The gland also utilizes a crushable sealant 711 such as lava seal or some other high temperature resistant sealing agent to ensure a temperature resistant and pressure resistant seal. The light conduit passes through the pressurized nitrogen buffer chamber and then passes through the nitrogen pressure cap 716 via the secondary pressure sealing gland 718. The secondary pressure sealing gland is similar to the primary pressure sealing gland includes a gland body 720, a optical fiber T-ferrule 722, a T-ferrule washer 724, a compression nut 723 and a crushable sealant 721 to maintain the pressure integrity of the system. As previously noted, the primary pressure sealing gland is of a size and shape such that it can be inserted into the focusing lens chamber in the focusing lens barrel. In addition, the primary pressure sealing gland should be of such a length that the focusing lens focuses the incoming or out going laser pulses into the end of the optical fiber. The secondary pressure sealing gland should be configured so that an fiber optic connector 729 can optically connect the optical fiber coupling end of the optical fiber to a flexible optical fiber cable 728.

In this particular embodiment, it has been found that a metal cladding around the optical fiber is preferred. It is believed that the metal cladding helps prevent the stress induced fracturing of the optical fiber caused by the thermomechnaical forces generated within the high pressure sealing glands. The metal cladding may be any suitable metal for coating the optical fiber and which is compatible with the conditions and requirements of the process occurring in the reactor. In one preferred embodiment the metal cladding is selected from aluminum, gold, platinum, silver, copper, and combinations and alloys of these metals, more preferable is a gold cladding.

In view of the above disclosure, one of ordinary skill in the art should appreciate that the present invention includes an apparatus for measuring the temperature of a reactor. Such an apparatus should include: a feed injector, a blind flange, a light conduit, a pressure sealing gland an optical coupler, an optical focusing means and a pyrometer. The feed injector includes a feed injector tip having an opening, the feed injector tip being in fluid communication with a feed inlet and a flange connector, the flange connector being in optical alignment with the opening of the feed injector tip. The blind flange should be sized to fit on the flange connector of the feed injector and thereby form a gas pressure resistant seal. The pressure sealing gland is fitted in the blind flange such that the light conduit can pass through the blind flange and that the receiving end of the light conduit extends into the feed injector such that the light receiving end of the light conduit is in optical alignment with the opening of the feed injector tip. The optical coupler functions as an optical connection between the light transmitting end of the light conduit to a fiber optic cable and thus the pyrometer.

In one preferred embodiment, the apparatus further includes: a second light conduit, the second light conduit having a light receiving end and light transmitting end; a second pressure sealing gland fitted in the blind flange such that the second light conduit can pass through the blind flange and that the light transmitting end of the light conduit is in optical alignment with the opening of the feed injector tip; and a second optical coupler, the optical couple connecting the light receiving end of the second light conduit to a second fiber optic cable. A coherent light source in the pyrometer should be optically coupled to the light conduit such that light passes out of the source, through the second fiber optic cable to the light receiving end of the second light conduit, through the second light conduit and out the light transmitting end of the light conduit and out the opening in the injector tip. The receiving end of the first light conduit should be optically aligned to receive the reflections of the coherent light transmitted by the second light conduit out the opening in the injector tip. In one embodiment the light conduit may be a sapphire rod or sapphire optical fiber. Alternatively, the light conduit may be a metal coated silica optical fiber.

Another illustrative embodiment of the present invention includes an apparatus for using an optical pyrometer to measure the temperature of a reactor under pressure and temperature. Such an illustrative embodiment may include a welded connecting spool piece, having a reactor connecting end and pyrometer connecting end; and a blind flange, the blind flange having a reactor face and a pyrometer face, wherein the reactor face of the blind flange is sized to fit on the pyrometer connecting end of the welded connecting spool piece. On the reactor face of the blind flange there may be fitted at least one primary pressure sealing gland. The role of the primary pressure sealing gland is to allow the passage of a light conduit through the blind flange without interfering with the pressure integrity of the blind flange connection. The light conduit itself has a light receiving end and a light transmitting end and the light conduit passes through the blind flange by way of the primary pressure sealing gland. This positions the light receiving end of the light conduit to receive light emanating from within the reactor. A focusing lens barrel may be connected to the reactor face of the blind flange and the focusing lens barrel should be of a size such that it may be inserted into the welded connecting spool piece. The focusing lens barrel has at least one focusing lens chamber of a size and position such that the primary pressure sealing gland on the reactor face of the blind flange inserts into the focusing lens chamber. The focusing lens chamber also has fixed within it a focusing lens positioned within the focusing lens chamber such that the focal point approximately the light receiving end of the light conduit. A pressure cap having a reactor face with a recess forms a pressurized gas chamber with the pyrometer face of the blind flange. On the pyrometer face of the pressure cap there is fitted at least one secondary pressure sealing gland positioned such that the light conduit passes from the primary pressure sealing gland, through the pressurized gas chamber and through the secondary pressure sealing gland. The pressure cap also has at least one gas inlet in fluid connection with a source of gas and the pressurized gas chamber so as to supply pressurized gas to the pressurized gas chamber. A seal flange having a reactor face fixed against the pyrometer face of the pressure cap such that if forms a base for connecting a protective sleeve which protects the connection between the light conduit and the flexible optical cable from being damaged during handling of the entire apparatus. The seal flange has an opening such that the secondary pressure sealing gland can pass through the seal flange. A flexible optical fiber cable having a reactor and a pyrometer end, is optically coupled to the light transmitting end of the light conduit, the light transmitting end of the light conduit having passed through the secondary pressure sealing gland. The pyrometer end of the fiber optic cable is optically coupled to a pyrometer. In one preferred embodiment, at least two light conduits are utilized. The first light conduit is used to transmit coherent light into the reactor and the second light conduit being used to receive the reflection of the coherent light transmitted into the reactor, as well as the infrared radiation generated by the heat of the reactor walls, so as to determine the temperature of the reactor. In each of the above embodiments, the light conduit may be a sapphire rod or sapphire optical fiber or preferably the light conduit may be a metal coated silica optical fiber.

While the structures and methods of the present invention have been described in terms of preferred embodiments, it will be apparent to those of skill in the art that variations may be applied to what has been described herein without departing from the concept and scope of the invention. All such similar substitutes and modifications apparent to those skilled in the art are deemed to be within the scope and concept of the invention as it is set out in the following claims.

What is claimed is:

1. An apparatus comprising
   a feed injector including a feed injector tip having an opening, the feed injector tip being in fluid communication with a feed inlet and a flange connector, the flange connector being in optical alignment with the opening of the feed injector tip;
   a blind flange sized to fit on the flange connector of the feed injector and thereby form a gas pressure resistant seal,
   a light conduit, the light conduit having a light receiving end and a light transmitting end;
   a pressure sealing gland, fitted in the blind flange such that the light conduit can pass through the blind flange and that the receiving end of the light conduit extends into the feed injector such that the light receiving end of the light conduit is in optical alignment with the opening of the feed injector tip;
   an optical coupler, the optical coupler connecting the light transmitting end of the light conduit to a fiber optic cable and
   a pyrometer, the pyrometer being optically connected to the fiber optic cable.

2. The apparatus of claim 1 further comprising:
   a second light conduit, the second light conduit having a light receiving end and light transmitting end;
   a second pressure sealing gland fitted in the blind flange such that the second light conduit can pass through the blind flange and that the light transmitting end of the light conduit is in optical alignment with the opening of the feed injector tip;
   a second optical coupler, the optical couple connecting the light receiving end of the second light conduit to a second fiber optic cable;
   a coherent light source in the pyrometer, the coherent light source being optically coupled to the second fiber optic cable such that light passes out of the source, through the second fiber optic cable to the light receiving end of the second light conduit, through the second light conduit out the light transmitting end of the light conduit, and out the opening in the injector tip;
   and wherein the receiving end of the first light conduit is optically aligned to receive the reflections of the coherent light transmitted by the second light conduit out the opening in the injector tip.

3. The apparatus of claim 1 wherein the light conduit is a sapphire rod or sapphire optical fiber.

4. The apparatus of claim 1 wherein the light conduit is a metal coated silica optical fiber.

5. The apparatus of claim 1 further comprising
   an optical isolation tube having a first and a second end, the first end being rigidly connected to the reactor face of the blind flange and the second end being in optical alignment with the opening of the feed injector tip; and
   an imaging lens, said lens being positioned within the optical isolation tube between the first end and the second end such that the focal point of said lens is about the light receiving end of the light conduit.

6. An apparatus for measuring the temperature of a reactor comprising:
   a feed injector including a feed injector tip having an opening in optical alignment with a welding neck flange;
   a spool piece having a reactor end and a pyrometer end the reactor end being connected to the welding neck flange of the feed injector;
   a compression plate, the compression plate having a first and a second face, the first face forming a pressure resistant seal with the pyrometer end of the spool piece,
   a light conduit having a first end and a second end
   a primary pressure sealing gland, said sealing gland being rigidly affixed to the second face of the compression plate, wherein said primary pressure sealing gland allowing the light conduit to pass through the compression plate;
   an optical isolation tube having a first and a second end, the first end being rigidly connected to the first face of the compression plate and the second end being in optical alignment with the opening of the feed injector tip;
   an imaging lens, said lens being positioned within the optical isolation tube between the first end and the second end such that the focal point of said lens is about the first end of the light conduit;
   a safety buffer chamber connected to the compression plate in a gas tight connection, the safety buffer chamber housing at least one flexible fiber optic cable having a first and a second end, the first end of the flexible optical cable forming an optical connection with the second end of the light conduit, wherein the safety buffer chamber includes at least one secondary pressure sealing gland, the secondary pressure sealing gland allowing the flexible fiber optic cable to pass out of the safety buffer chamber and thus allowing the second end of the flexible fiber optic cable to be connected to a pyrometer.

7. The apparatus of claim 6 further comprising
a second light conduit, the second light conduit having a first end and a second end;
a second pressure sealing gland fitted in the compression plate such that the first end of the second light conduit can pass through the compression plate;
a second optical isolation tube having a first and a second end, the first end of the second optical isolation tube being rigidly connected to the first face of the compression plate and the second end of the second optical isolation tube being in optical alignment with the opening of the feed injector tip;
a second imaging lens, said lens being positioned within the optical isolation tube between the first end of the optical isolation tube and the second end of the optical isolation tube such that the focal point of said lens is about the first end of the second light conduit;
a second optical coupler, the optical coupler connecting the second end of the second light conduit to a second fiber optic cable;
a coherent light source in the pyrometer, the coherent light source being optically coupled to the second fiber optic cable such that light passes out of the source, through the second fiber optic cable to the light receiving end of the second light conduit, through the second light conduit and out the light transmitting end of the light conduit, through the second imaging lens and out the opening in the injector tip; and
wherein the receiving end of the first light conduit is optically aligned to receive the reflections of the coherent light transmitted by the second light conduit out the opening in the injector tip.

8. The apparatus of claim 6 wherein the safety buffer chamber is connected to a source of high pressure nitrogen gas so that the safety chamber is at a higher pressure that the reactor; and a safety alarm system to monitor the pressure and flow of nitrogen to the safety buffer chamber so as to detect leaks in the safety buffer chamber and the pressure sealing glands.

9. An apparatus for determining the temperature of a reactor, wherein the reactor has an exterior wall and attached to said exterior wall is a flange connection through which optical access to the reactor interior is achieved, the apparatus comprising
a spool piece having a first and a second end, the first end being connected to the flange connection, wherein the spool piece has connected to it a high pressure inert gas inlet for providing high pressure inert gas to maintain the optical access to the reactor interior;
a compression plate having a reactor face and a pyrometer face, the reactor face of the compression plate forming a gas tight seal with the second end of the spool piece,
at least one light conduit, the light conduit having a first end and a second end;
at least one primary pressure sealing gland fixed on the reactor face of said compression plate, said primary pressure sealing gland permitting the light conduit to pass through the compression plate so that the first end of the light conduit is ir optical communication with the interior of the reactor;
at least one flexible fiber optic cable having a first end and a second end, the first end of said flexible fiber optic cable being optically coupled to the second end of the light conduit and the second end of said flexible fiber optic cable being optically coupled to a pyrometer.

10. The apparatus of claim 9 further comprising:
a nitrogen buffer chamber, said nitrogen buffer chamber being connected to the pyrometer face of the compression plate, said nitrogen buffer chamber being connected to a source of nitrogen gas, and wherein said chamber allows the flexible fiber optic cable to pass through the chamber and exit the chamber via a secondary pressure sealing gland.

11. The apparatus of claim 10 further comprising a safety ball valve, said safety ball valve being located between the spool piece and the flange connection on the exterior wall of the reactor, such that the closing of the valve closes the optical pathway into the interior of the reactor.

12. An apparatus for using an optical pyrometer to measure the temperature of a reactor under pressure and temperature comprising:
a welded connecting spool piece, having a reactor connecting end and pyrometer connecting end;
a blind flange, the blind flange having a reactor face and a pyrometer face, wherein the reactor face of the blind flange is sized to fit on the pyrometer connecting end of the welded connecting spool, and wherein on the reactor face there is fitted at least one primary pressure sealing gland,
a light conduit having a light receiving end and a light transmitting end, the light conduit passing through the blind flange by way of the primary pressure sealing gland and thereby the light receiving end being positioned to receive light emanating from within the reactor;
a focusing lens barrel connected to the reactor face of the blind flange and of a size such that it may be inserted into the welded connecting spool piece, the focusing lens barrel having at least one focusing lens chamber of a size and position such that the primary pressure sealing gland on the reactor face of the blind flange inserts into the focusing lens chamber, and wherein the focusing lens chamber has fixed within it a focusing lens positioned within the focusing lens chamber such that the focal point is approximately the light receiving end of the light conduit;
a pressure cap having a reactor face and a pyrometer face, the reactor face having a recess in the face such that the recess of the pressure cap forms a pressurized gas chamber with the pyrometer face of the blind flange, and wherein on the pyrometer face of the pressure cap there is fitted at least one secondary pressure sealing gland positioned such that the light conduit passes from the primary pressure sealing gland, through the pressurized gas chamber and through the secondary pressure sealing gland, and wherein the pressure cap has at least one gas inlet in fluid connection with a source of gas and the pressurized gas chamber so as to supply pressurized gas to the pressurized gas chamber;
a seal flange, the seal flange having a reactor face and a pyrometer face, the reactor face being fixed against the pyrometer face of the pressure cap such that it forms a base for connecting a protective sleeve which protects the connection between the light conduit and the flexible optical cable, and wherein the seal flange has an opening such that the secondary pressure sealing gland can pass through the seal flange; and a flexible optical fiber cable having a reactor and a pyrometer end, the reactor end of the flexible optical fiber cable being optically coupled to the light transmitting end of the light conduit, the light transmitting end of the light conduit having passed through the secondary pressure sealing gland, and the pyrometer end being optically coupled to a pyrometer.

13. The apparatus of claim 12 wherein at least two light conduits are utilized, the first light conduit being used to transmit coherent light into the reactor and the second light conduit being used to receive the reflection of the coherent light transmitted into the reactor and the infrared radition generated by the reactor walls, so as to determine the temperature of the reactor.

14. The apparatus of claim 12 wherein the light conduit is a sapphire rod or sapphire optical fiber.

15. The apparatus of claim 12 wherein the light conduit is a metal coated silica optical fiber.

* * * * *

UNITED STATES PATENT AND TRADEMARK OFFICE
CERTIFICATE OF CORRECTION

PATENT NO. : 6,053,632
ISSUED : April 25, 2000
INVENTOR(S) : Thomas Leininger It is certified that error appears in the above-identified patent and that said Letters Patent is hereby corrected as shown below:

In Col. 14, Line 3, delete "ir" and insert -- in --.

Signed and Sealed this

Twentieth Day of March, 2001

*Attest:*

NICHOLAS P. GODICI

*Attesting Officer*   *Acting Director of the United States Patent and Trademark Office*